United States Patent [19]
Miller et al.

[11] Patent Number: 4,876,296
[45] Date of Patent: Oct. 24, 1989

[54] METHOD AND COMPOSITION FOR CONTROLLED THICKENING OF THERMOSETTING RESINS USING MICROENCAPSULATED THICKENERS

[75] Inventors: J. Stanley Miller, North Haven, Conn.; Thomas J. Bowles, Dayton, Ohio

[73] Assignee: Olin Corporation, Cheshire, Conn.

[21] Appl. No.: 43,055

[22] Filed: Apr. 27, 1987

[51] Int. Cl.$^4$ .......................... C08K 9/00; B01J 13/02; B05D 7/00; B32B 5/16
[52] U.S. Cl. .................................... 523/200; 523/448; 524/40; 524/401; 524/433; 427/213.3; 427/213.36; 428/402.24
[58] Field of Search ............... 523/201, 202, 448, 200; 427/213.3, 213.36; 524/401, 433, 40; 428/402.24

[56] References Cited
U.S. PATENT DOCUMENTS
3,956,230  5/1976  Gaylord ............................. 524/586
3,963,512  6/1976  Swift et al. ......................... 524/850

OTHER PUBLICATIONS
Gutcho, M. H., "Microcapsules and Microencapsulation Techniques", Noyes Data Corporation, New Jersey, 1976, pp. 319–321.

Primary Examiner—John Kight
Assistant Examiner—Nathan M. Nutter
Attorney, Agent, or Firm—Dale L. Carlson; Paul Weinstein

[57] ABSTRACT
A method and composition employing microencapsulated thickeners for providing controlled thickening of thermosetting resins, including sheet molding compositions.

3 Claims, No Drawings

METHOD AND COMPOSITION FOR CONTROLLED THICKENING OF THERMOSETTING RESINS USING MICROENCAPSULATED THICKENERS

FIELD OF THE INVENTION

This invention relates generally to a method and composition employing microencapsulated thickeners for providing controlled thickening of thermosetting resins, including sheet molding compositions.

BACKGROUND OF THE INVENTION

Unsaturated thermosetting polyester resins are widely used in industry today for the production of moldings, for example, automobile parts molded from sheet-molding compound, electical breaker boxes, appliance housings, business machine housings, and a wide range of reinforced parts. These resins are polycondensation products which are based on the reaction of dibasic acids with dihydric alcohols. Ethylenic unsaturation is incorporated into the resin, generally by use of an unsaturated acid (e.g., maleic anhydride); although a saturated acid, (e.g. isophthalic or adipic acid) may also be present. The alcohol is typically saturated, e.g., propylene glycol. The unsaturated polyesters are usually crosslinked through their double bonds with a compatible monomer (such as styrene) which also contains ethylenic unsaturation, and thereby become thermoset. The polyester itself is often blended with a thermoplastic oligomer in order to obtain modified physical property characteristics. For example, a polyvinyl acetate/styrene oligomer and/or an acrylic oligomer such as a polymethacrylate/styrene oligomer are commonly included as so-called "low-profile additives" to improve surface smoothness of the resulting molded article. (As used herein, the term "polyester resin" is meant to include not only the polyester itself but also the crosslinking monomer which is conventionally added to the polyester and any other modifying resin that is blended with the polyester). The molding material may also typically include a conventional filler and/or reinforcing agent, a mold release agent and a thickener.

To effect crosslinking of the polyester, a catalyst of the organic peroxide type is generally used. The catalyst is generally premixed with the resin prior to molding and is thermally activated upon molding to initiate the crosslinking reaction. Using such a technique, curing does not begin until the mixture containing the catalyst is exposed to activating temperatures typically in the range of 275° to 350° F.; the optimum temperature to be used depends upon the specific nature of the catalyst, the duration of the molding cycle, and other factors.

Prior to conducting the sheet molding operation, so-called "sheet molding compound" or "SMC" is conventionally prepared by adding a stream containing a thickener to a stream containing unsaturated polyester and any other modifying resin. The resulting paste is passed through a so-called "SMC machine" to provide a composite sandwich having a middle layer of reinforcing agent, such as chopped fiber glass roving, and a top and bottom layer of this paste. The composite is then pressed by, for example, chain belt compaction rollers at a pressure of between 20 and 80 psi to provide good "wet-out" of the reinforcing agent by the paste and to initiate ionic polymerization of the paste up to a viscosty of about 15 to 20 million centipoise, thus providing a leather-like composite sheet which is ready to be cut into strips for the subsequent sheet molding operation, typically in a heated compression mold.

If a thickener is used in the conventional manner as described above, various disadvantages and obstacles are encountered. First, there are extra equipment costs and potential processing problems associated with the presence of the second stream utilized to provide thickener for the SMC composition. Second, and more importantly, the conventional addition of thickener to form the sheet molding composition sometimes results in the premature thickening of the SMC composition, thereby clogging the SMC machine and causing downtime and associated production losses.

If a thickener is not used in making the composite, there frequently are processing problems on the SMC machine due to loss of paste out the sides of the hot press since, without thickener, the paste has a low viscosity and tends to flow out of the press rather than bind to the reinforcing agent when the press is closed.

In view of the above, it would be highly desirable to provide a composition characterized by a controlled thickening capability. In a sheet molding context, such a composition is expected to be highly desired since it would avoid or minimize the above-discussed SMC extra equipment costs and processing problems.

SUMMARY OF THE INVENTION

In one aspect, the present invention relates to a composition comprising at least one unsaturated polyester or acrylate, at least one thermoplastic low-profile additive, at least one binder selected from the group consisting of reinforcing agents, fillers, and combinations thereof, at least one microencapsulated thickener, and a catalyst selected from the group consisting of peroxyesters (such as peroxybenzoates or peroxybutyrates), peroxyketones, peroxyketals, and mixtures thereof.

In another aspect, the present invention relates to a method for fabricating a composition characterized by a controlled thickening capability which comprises adding rupturable microcapsules of at least one microencapsulated thickener to a composition comprising at least one unsaturated polyester or acrylate, at least one thermoplastic low-profile additive, at least one binder selected from the group consisting of reinforcing agents, fillers, and combinations thereof, and a catalyst selected from the group consisting of peroxyesters, peroxyketones, peroxyketals and mixtures thereof.

In yet another aspect, the present invention relates to a method of forming microcapsules having a shell of thermoplastic polymer and a core of at least one microcapsuled thickener which comprises enwrapping thickener particles of said thickener selected from the group consisting of magnesium oxide, magnesium hydroxide, calcium oxide, calcium hydroxide, and mixtures thereof, with a thermoplastic polymer to form said microcapsules containing a core of said thickener particles.

In still another aspect, the present invention relates to the microcapsules formed by the above-described method.

DETAILED DESCRIPTION OF THE INVENTION

In accordance with the method of the present invention, there is provided a means for controllably releasing thickener into the molding composition in a fashion such that the composition viscosity is maintained within the desired level of below about 50,000 cp. between the time the microencapsulated thickener is added to the resinous materials and filler up until about the time the SMC is to be fabricated on the SMC machine. Without wishing to be bound by any particular theory, the viscosity control associated with the composition of the present invention is associated with the controlled rupture capability associated with the thermoplastic polymer shell encapsulating the core of the microencapsulated thickener.

Without wishing to limit the scope of the present invention, it is generally envisioned that the viscosity of the composition of the present invention can be maintained below the above-mentioned desired level for up to ten hours or more by appropriate selection of the thickener in conjunction with shell polymer, wall thickness, and shell rupturing technique utilized to release the thickener from the microcapsules.

Suitable thickeners for the core of the microcapsules include magnesium oxide, magnesium hydroxide, calcium oxide, calcium hydroxide, and mixtures thereof. The thickener is suitably employed in an amount of up to about 5 weight percent, preferably between about 0.1 and about 3 weight percent, based upon the total weight of the composition.

The microcapsules are generally formed with capsule shells of thermoplastic polymer, preferably one selected from the group consisting of polyethylene, polystyrene, cellulose acetate butyrate, and combinations thereof. Microcapsule shell rupturing is typically effected by rupturing means selected from the group consisting of: (a) solvent dissolving of said capsule walls, (b) ultrasound rupturing, (c) abrasion rupturing, (d) pressure rupturing, and combinations thereof. Although abrasion rupturing and solvent dissolving of the shell are preferred, techniques such as ultrasound are expected to have advantages where it is desired to prepare the molding composition containing the microencapsulated thickener days prior to the making of SMC.

Microencapsulation of the thickener is suitably effected by conventional techniques such as by the in situ polymerization of monomers in a dispersion of said particles of said thickener in an aqueous or organic solvent, or mixture thereof, thereby forming said microcapsules having a thermoplastic polymer shell and a core of thickener particles or by preforming said thermoplastic polymer and enwrapping said thickener particles or groups of said thickener particles therewith in a solvent-free environment. Preferably, the microcapsules employed in the present invention have particle sizes of less than about 50 microns, more preferably between about 5 and about 30 microns. The finished encapsulated thickener should be dispersable in the molding composition of which it is a part. The polymer comprising the shell should not contain electronegative groups which might bond or interact with the acid functionality of the polyester and low-profile additives. The various microencapsulation techniques that can be employed are well-known. See, for example, M. H. Gutcho's textbook "MICROCAPSULES AND MICROENCAPSULATION TECHNIQUES" published by Noyes Data Corporation, 1976.

In a typical method of preparing the microcapsules, the thermoplastic polymer is dissolved in a suitable organic solvent. Then, the thickener, preferably in the form of a powder, is dispersed into the thermoplastic polymer solution with high shear mixing. Once the dispersion is achieved, a non-solvent for the thermoplastic polymer (i.e., a solvent in which the thermoplastic polymer is insoluble) is added to the dispersion. The thermoplastic polymer will precipitate out of solution, removing the thickener with it. The rate of addition of the non-solvent will determine the amount of coating that will deposit on the thickener particles to form the microcapsules. An example of a method of preparing the microcapsules is as follows: 2.0 grams of cellulose acetate di-n-butylaminohydroxypropyl ether (hereinafter called CABP) is dissolved in 50 ml of acetone and then 3 grams of magnesium hydroxide having particle sizes of less than 25 microns are dispersed in the solution. The dispersion is added with stirring to 300 ml of aqueous 50 percent magnesium chloride solution having a pH of 13. By elevating the temperature of the system to 40° C. under a slightly reduced pressure and stirring the system continuously for three hours, 7.5 grams of CABP capsules filled with magnesium hydroxide and having diameters of less than 25 microns are obtained. The capsules are collected and dried and are then used in the molding compositions of the present invention.

The unsaturated polyesters useful in the molding compositions of the present invention can be any of those well-known in the art, such as propylene glycol/maleate and isophthalic acid-modified propylene glycol/maleate unsaturated polyesters, with the propylene glycol/maleates being preferred. Useful unsaturated polyesters have a molecular weight of between about 500 and about 5000, preferably between about 1500 and about 3500. Acrylates which are useful as a base fluid include ($C_{12}$–$C_{30}$) alkyl, or ($C_{12}$–$C_{30}$) alkenyl, acrylates or methacrylates such as lauryl acrylate, myristyl acrylate, palmityl acrylate, stearyl acrylate, linoleyl acrylate, linolenyl acrylate, stearyl acrylate; similar improvements in flexibility may be obtained by including with the required binder monomers long chain ($C_{12}$–$C_{30}$) aliphatic acid vinyl esters, e.g., the dibutyl, dihexyl, or dioctyl fumarate, maleate, or itaconate. Small proportions of multi-functional, i.e., polyethylenically unsaturated acrylates such as polyol(meth)acrylates and polyalkylene polyol(meth)acrylates, such as ethylene glycol diacrylate or dimethacrylate, triethylene glycol(meth)acrylate can be employed in the compositions for fabricating the molded articles in accordance with the method of the present invention. All of these monomeric materials have low volatility and are polymerizable by the action of the peroxide. The total amount of unsaturated polyester plus acrylate used in the compositions useful in the method of the present invention is between about 0.5 weight percent and about 70 weight percent based on the weight of the total composition, depending upon whether acrylate, unsaturated polyester, or a mixture thereof is employed. When employing solely acrylates, between about 0.5 weight percent and about 30 weight percent is generally used, whereas when employing solely unsaturated polyesters, between about 30 and about 70 weight percent is generally used.

A thermoplastic low-profile additive is suitably employed in the composition of the present invention. One group of low-profile additives which may be employed is the polyalkenyl aromatic thermoplastics. Typical alkenyl aromatic monomers include styrene, vinyl toluene, t-butyl styrene, methyl styrene and the like. Mixtures of said monomers may be used in preparing the polymerized thermoplastic and the term "polyalkenyl aromatic thermoplastic" is intended to include such polymerized mixtures. Polystyrene is a particularly useful low-profile additive.

A second group of low-profile additives, which also imparts impact resistance, includes polydiene rubbers which in polymerized form contain about 30 to 100 weight percent of a conjugated diene or mixtures thereof and correspondingly from 0 to 70 1 percent of a monoalkenyl aromatic monomer. Said polydiene rubbers may be random, graft, or block copolymers all of which and their preparation are well known. Many different polydiene rubbers are available commercially. Typical polydiene rubbers are fully disclosed in U.S. Pat. No. 3,674,893 and are incorporated herein by reference. Conjugated diene monomers include butadiene, isoprene, chloroprene and like monomers, preferably those having four to eight carbon atoms. Butadiene is a preferred monomer, and styrene is a preferred comonomer. Polybutadiene and styrene-butadiene copolymers, especially the block copolymers, are preferred low-profile additives.

A third group of low-profile additives includes the polyalkyl acrylate or methacrylate thermoplastics. Preferably the alkyl group contains from one to about six carbon atoms. The most commonly used polyalkyl methacrylate is polymethyl methacrylate which is preferred herein. It is understood that mixtures of various alkyl acrylate or methacrylate monomers may be used to prepare the thermoplastic polymers.

Other known polymeric low-profile additives include polyolefins such as polyethylene, polyvinyl acetates, polycaprolactones, cellulose acetate butyrates and numerous other thermoplastic organic polymeric materials. Mixtures of low-profile additives may also be used, e.g., a mixture of polystyrene and a polydiene rubber is a particularly beneficial mixture.

Particularly preferred low-profile additives include polyurethane oligomers having a molecular weight of between about 10,000 and about 30,000, preferably between about 15,000 and about 25,000. These oligomers are preferably acid end-capped using a dicarboxylic acid anhydride in an amount sufficient to give an acid number of between about 1.0 and about 5.0 milligrams of potassium hydroxide per gram of mixture. The polyurethane oligomer is prepared by first reacting an organic polyisocyanate with a polyol in an equivalent ratio of NCO/OH from about 0.3/1 to about 0.99/1, using standard procedures, to yield a hydroxyl-terminated prepolymer of desired molecular weight. In a preferred aspect, this hydroxyl-terminated prepolymer is then reacted with a dicarboxylic acid anhydride to provide end-capping of the resulting oligomer. Preferably, the NCO/OH ratio ranges from about 0.60/1 to about 0.99/1. Common urethane catalysts, e.g., tertiary amines and metal compounds such as stannous octoate, dibutyltin dilaurate or dibutyl di-(lauryl mercapto)tin, may be used to accelerate the reaction.

In preparing the low-profile additive, other ingredients, such as chain extenders, well known to those in the polyurethane art, also may be included in the reaction mixture. These chain extenders include low molecular weight glycols such as ethylene glycol, 1,3-propylene glycol, 1,2-propylene glycol, butane diols, hexane diols, and the like. The reaction temperature and time for preparing the low-profile additive will depend upon many factors including the nature of the reactants being employed. In general, reaction temperatures of from about 20° C. to about 110° C. and reaction times of from about 0.5 hours to about 4.0 hours are preferred.

The preferred low-profile additive useful in the composition of the present invention is a polyurethane oligomer commercially available as URALLO® 85-05, a product of Olin Corporation. This product is a clear liquid with a viscosity of about 1000 cps at 25° C. Another suitable commercial product is URALLOY® 2030, a product of Olin Corporation.

To obtain smooth surfaces in the molded article, it is preferred to use between about 2 and about 15 weight percent of said low-profile additive based upon the total weight of the composition.

The compositions useful in the method of the present invention suitably contain at least one binder which is a reinforcing agent, a filler or both. Useful reinforcing agent include glass fibers (e.g., continuous roving mat or chopped glass fibers), glass beads, glass microspheres, polyester fibers, polyaramid fibers (such as the fibrilated-type commercially available as KEVLAR® a product of E. I. Du Pont de Nemours & Co., Inc.), carbon fibers, graphite fibers, and mixtures thereof. The reinforcing agent is suitably employed in an amount of between about 5 weight percent and about 75 weight percent, preferably between about 15 weight percent and about 35 weight percent, based upon the total weight of the molding composition.

Useful fillers include calcium carbonate, aluminum trihydrate, kaolin clays, mixtures thereof, and the like. The filler is suitably employed in an amount of up to 75 percent based upon the total weight of the composition, preferably in an amount of between about 25 weight percent and about 60 weight percent.

Useful catalysts includes peroxybenzoates such as TBPB and peroxyoctoates, such as t-butylperoxy-2-ethyl-hexanoate. The preferred mold temperature range when using TBPB catalyst is between about 300° F. and about 325° F. The preferred mold temperature range when using T-butylperoxy-2-ethyl-hexanote is between about 275° F. and about 300° F. These catalysts can be used alone or in combination with a co-catalyst such as tin co-catalyst. Useful tin co-catalysts include dibutyltin dilaurate, t-butyl thioether tin complex (commercially available as Witco Chemical Co.'s "UL-1" catalyst), and the like. The total amount of catalyst used is generally between about 0.1 and about 5 weight percent, preferably between about 0.2 and about 1 weight percent, based on the weight of the composition.

The compositions useful in the present invention also optionally contain a mold-release agent in order to facilitate de-molding of the molded article. Suitable mold-release agents include calcium stearate, zinc stearate, mixtures thereof, and the like. If used, the mold-release agent is employed in an amount of up to about 5 weight percent, preferably between about 0.5 and about 3 weight percent, based upon the total weight of the composition. Alternatively, de-molding of the composition can be suitably effected using an external mold-release agent applied directly to the mold.

A pigment is also optionally employed in the compositions useful in the present invention. Suitable pigments include carbon black, iron oxide, titanium dioxide, mixtures thereof, and the like. If used, the pigment is suitably employed in an amount of up to about 3 weight percent, preferably between about 0.01 and about 0.5 weight percent, based upon the weight of the composition.

The compositions of the present invention are suitably employed as sheet molding compositions (SMC) or bulk molding compositions (BMC). When SMC is desired, the compositions are preferably formed into a leather-like sheet having a viscosity of between about 10 million and about 100 million cps prior to sheet molding, a well-established procedure.

The following examples are intended to illustrate, but in no way limit, the scope of the present invention.

EXAMPLE

Thickening Tests on Abrasion Rupturable Microncapsulated Magnesium Oxide with a Polyethylene (PE) or Cellulose Acette Butyrate (CAB) Shell A paste was mixed having the following composition:

| | |
|---|---|
| Freeman Chemical's STYPOL ® 40-3941 Propylene Glycol/-Maleate Unsaturated Polyester having a MW of about 1500 | 60 parts/100 parts by weight of resin |
| URALLOY ® LPX-2030 low-profile additive | 40 parts/100 parts by weight of resin |
| TBPB | 1 part/100 parts by weight of resin |
| Zinc Stearate | 4 parts/100 parts by weight of resin |
| black pigment | 0.06 parts/100 parts by weight of resin |
| Calcium carbonate | 200 parts/100 parts by weight of resin |

Commercial grade magnesium oxide was microencapsulated with either a polyethylene (PE) shell or a cellulose acetate butyrate (CAB) shell, as identified in Tables I and II below. Samples A, B, C, and D as identified in those tables contained, respectively, 12 percent, 6 percent, 9 percent, and 20 percent by weight of shell based on the total weight of shell plus magnesium oxide in the capsules. The microcapsules were added to the paste in an amount of 1 or 4 parts by weight. Thickening response and the seven day maturation viscosities were measured for these compositions and determined to have the values as given in Tables I and II below. Control runs also performed using unencapsulated magnesium oxide.

The one hour thickening is shown below. The encapsulated magnesium oxide was added to the 90° F. paste and stirred at high shear for 90 seconds, followed by elapsed time viscosity measurements as given in Table I.

TABLE I

| | | One Hour Thickening* | | | | | |
|---|---|---|---|---|---|---|---|
| | | One Part Per 100 Parts by weight of resin | | | Four Parts Per 100 Parts by weight of resin | | |
| | | Elapsed Time | | | | | |
| Shell | Sample | 15 min | 30 min | 60 min | 15 min | 30 min | 60 min |
| CAB | A | 60 | 84 | 92 | 100 | 120 | 240 |
| | B | 56 | 80 | 100 | 88 | 138 | 208 |
| PE | C | 44 | 48 | 48 | 64 | 64 | 92 |
| | D | 44 | 44 | 40 | 48 | 52 | 64 |
| None | E** | 144 | 232 | 376 | 616 | 2624 | 11,840 |

*M cps for all calculations
**control

The maturation viscosity of these paste samples was followed for seven days to determine if they mature quickly to a moldable viscosity and remain moldable over time. The data for this is given in Table II below

TABLE II

| | | Seven Day Maturation* | | | | | | | |
|---|---|---|---|---|---|---|---|---|---|
| | | One Part Per 100 Parts by weight of resin | | | | Four Parts Per 100 Parts by weight of resin | | | |
| | | Elapsed Days | | | | | | | |
| Shell | Sample | 1 | 2 | 5 | 6 | 1 | 2 | 5 | 6 |
| CAB | A | 10 | 15 | 27 | 28 | 32 | 50 | 72 | 67* |
| | B | 9 | 17 | 30 | 29 | 37 | 36 | 41 | 46 |
| PE | C | 3 | 6 | 18 | 19 | 22 | 28 | 37 | 29 |
| | D | 2 | 2 | 3 | 3 | 4 | 6 | 17 | 27 |
| None | E** | 7 | 11 | 18 | 22 | 30 | 34 | 44 | 48 |

*MM cps for all calculations
**control

Relative to a control amount of unencapsulated magnesium oxide, the encapsulated materials maintained the viscosity of the paste at a low level for one hour, but produced a high maturation viscosity in one day, as is frequently desirable in the industry.

For all samples the one and four parts of encapsulated magnesium oxide maintained the low viscosity needed in the making of the SMC. However, only the four part samples produced the quick maturation that is often desirable for rapid use in molding parts.

What is claimed is:

1. A composition comprising at least one unsaturated polyester, at least one thermoplastic low-profile additive, at least one binder selected from the group consisting of reinforcing agents, fillers, and combinations thereof, at least one microencapsulated thickener, and a catalyst selected from the group consisting of peroxyesters, peroxyketones, peroxyketals, and mixtures thereof, and wherein said microencapsulated thickener comprises microcapsules having a capsule shell of at least one thermoplastic polymer and a capsule core containing a thickener selected from the group consisting of magnesium oxide, magnesium hydroxide, calcium oxide, calcium hydroxide, and combinations thereof, and wherein said capsule shells comprise a thermoplastic polymer selected from the group consisting of polyethylene, polystyrene, cellulose acetate butyrate, and combinations thereof, and wherein said microcapsules have a particle size of between about 5 and about 30 microns, said low-profile additive being a polyurethane oligomer having a molecular weight of between about 10,000 and about 30,000.

2. A method for fabricating a composition characterized by a controlled thickening capability which comprises adding rupturable microcapsules of at least one microencapsulated thickener to a composition comprising at least one unsaturated polymer, at least one thermoplastic low-profile additive, at least one binder selected from the group consisting of reinforcing agents, fillers, and combinations thereof, and a catalyst selected from the group consisting of peroxyesters, peroxyketones, peroxyketals, and mixtures thereof, and wherein said microencapsulated thickener comprises microcapsules having a capsule shell of at least one thermoplastic polymer and a capsule core containing a thickener selected from the group consisting of magnesium oxide, magnesium hydroxide, calcium oxide, calcium hydroxide, and combinations thereof, and wherein said capsule shells comprise a thermoplastic polymer selected from the group consisting of polyethylene, polystyrene, cellulose acetate butyrate, and combinations thereof, and wherein said microcapsules have a particle size of between about 5 and about 30 microns, said low-profile additive being a polyurethane oligomer having a molecular weight of between about 10,000 and about 30,000.

3. A method of forming a microcapsules having a shell of thermoplastic polymer and a core of at least one microcapsuled thickener which comprises coating thickener particles of said thickener selected from the group consisting of magnesium oxide, magnesium hydroxide, calcium oxide, calcium hydroxide, and mixtures thereof with a thermoplastic polymer to form said microcapsules containing a core of said thickener particles, wherein said method is effected by the in situ polymerization of monomers in a dispersion of said particles of said thickener in an aqueous or organic solvent, or mixture thereof, thereby forming said microcapsules having a thermoplastic polymer shell and a core of thickener particles, and wherein said microencapsulated thickener comprises microcapsules having a capsule shell of at least one thermoplastic polymer and a capsule core containing a thickener selected from the group consisting of magnesium oxide, magnesium hydroxide, calcium oxide, calcium hydroxide, and combinations thereof, and wherein said capsule shells comprise a thermoplastic polymer selected from the group consisting of polyethylene, polystyrene, cellulose acetate butyrate, and combinations thereof, and wherein said microcapsules have a particle size of between about 5 and about 30 microns.

* * * * *

UNITED STATES PATENT AND TRADEMARK OFFICE
CERTIFICATE OF CORRECTION

PATENT NO. : 4,876,296

DATED : October 24, 1989

INVENTOR(S) : Miller et al

It is certified that error appears in the above—identified patent and that said Letters Patent is hereby corrected as shown below:

In column 9, at line 5 delete "polymer" and insert --polyester--.

Signed and Sealed this

Nineteenth Day of May, 1992

Attest:

DOUGLAS B. COMER

Attesting Officer

Acting Commissioner of Patents and Trademarks